United States Patent
Luan et al.

(10) Patent No.: US 11,409,615 B2
(45) Date of Patent: Aug. 9, 2022

(54) CLONING STORAGE VOLUMES FROM BACKUP

(71) Applicant: International Business Machines Corporation, Armonk, NY (US)

(72) Inventors: Leo Shyh-Wei Luan, Saratoga, CA (US); Sangeetha Seshadri, Plano, CA (US); David William Archer, Sammamish, WA (US); Violet Rodriguez, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 17/114,670

(22) Filed: Dec. 8, 2020

(65) Prior Publication Data

US 2022/0179754 A1    Jun. 9, 2022

(51) Int. Cl.
*G06F 11/14*    (2006.01)
*G06F 3/06*    (2006.01)

(52) U.S. Cl.
CPC .......... *G06F 11/1469* (2013.01); *G06F 3/065* (2013.01); *G06F 3/0619* (2013.01); *G06F 11/1448* (2013.01); *G06F 2201/84* (2013.01)

(58) Field of Classification Search
CPC .... G06F 3/0619; G06F 3/065; G06F 11/1469; G06F 11/1448
USPC ........................................................ 711/162
See application file for complete search history.

(56) References Cited

U.S. PATENT DOCUMENTS

| | | | |
|---|---|---|---|
| 7,346,623 B2 | 3/2008 | Prahlad et al. | |
| 7,409,511 B2 | 8/2008 | Edwards et al. | |
| 8,677,085 B2 | 3/2014 | Vaghani et al. | |
| 9,715,347 B2 | 7/2017 | Ryu et al. | |
| 2020/0104212 A1* | 4/2020 | Balcha | G06F 11/1458 |
| 2021/0049077 A1* | 2/2021 | Gibbons, Jr. | G06F 11/1464 |
| 2021/0365330 A1* | 11/2021 | Kushnir | G06F 11/1464 |
| 2021/0406133 A1* | 12/2021 | Shemer | G06F 9/45558 |
| 2022/0043721 A1* | 2/2022 | Shemer | G06F 11/1469 |
| 2022/0050858 A1* | 2/2022 | Karr | G06F 3/065 |

OTHER PUBLICATIONS

Mell et al., "The NIST Definition of Cloud Computing", Recommendations of the National Institute of Standards and Technology, Sep. 2011, 7 pages.

* cited by examiner

*Primary Examiner* — Than Nguyen
(74) *Attorney, Agent, or Firm* — Donald J. O'Brien (57) ABSTRACT

Embodiments are disclosed for a method. The method includes generating a backing layer having a file volume, in a layering file format and representing a portion of a volume snapshot that is backed up on a slower storage, and enabling an associated virtual machine. The method also includes generating an active layer comprising a second file volume, in the layering file format, representing a second portion of the volume snapshot, and enabling the associated virtual machine. The method further includes starting a process to pull a plurality of blocks from the backing layer to the active layer.

19 Claims, 8 Drawing Sheets

CLONING STORAGE VOLUMES FROM BACKUP

BACKGROUND

The present disclosure relates to cloning storage volumes, and more specifically, to cloning storage volumes from backup.

In virtual computing, a virtual machine (VM) is a technical configuration that appears to operate like a compute node with memory and a processor. However, the VM can actually operate like a computer application with inputs and outputs. Virtual machines can be managed by a hypervisor, which is similar to an operating system. The hypervisor can assign specific hardware resources to the VM, which provide the tools for the VM to operate.

SUMMARY

Embodiments are disclosed for a method. The method includes generating a backing layer having a file volume, in a layering file format and representing a portion of a volume snapshot that is backed up on a slower storage, and enabling an associated virtual machine. The method also includes generating an active layer comprising a second file volume, in the layering file format, representing a second portion of the volume snapshot, and enabling the associated virtual machine. The method further includes starting a process to pull a plurality of blocks from the backing layer to the active layer.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, a hypervisor is an operating system for VMS that can exclusively assign hardware resources, such as memory and processing, to the VM. Additionally, the hypervisor can periodically offload files stored in the assigned memory to backup storage. Backup storage can be slower and cheaper than the assigned memory. As such, backing up files can conserve financial resources. Offloading can involve taking a snapshot of the assigned memory. The snapshot refers to all of the assigned storage at a specific time.

With respect to virtual machines, a specific set of files in the assigned memory can include the operating system of the VM, other relevant software, and data for the virtual machine to use. Accordingly, the hypervisor can offload snapshots of the volumes containing these files to slower storage for later reuse.

When reusing these offloaded snapshots, the associated volume can be copied from slower storage to faster storage. However, copying offloaded volumes can be time-consuming. As such, it may be challenging to make restored volumes available in a relatively short time. To reduce the time it takes to make the offloaded snapshots accessible in faster storage, the copy can involve a process called hydration. For example, lazy hydration means that specific parts of the file contents are copied on-demand when the VM attempts to read them. With lazy hydration, the initial copy is not a full copy of the volume snapshot. Rather, a partial copy of the volume that is sufficient to make the VM operational is placed in the partially filled volume. Thereafter, more of the backup file is copied, i.e., hydrated, into the file based on a predetermined protocol, until the hydrating volume is fully hydrated.

One way to implement the hydration process is to use a storage product that creates the new hydrating volume from a snapshot. Thus, reducing the time it takes to copy offloaded volumes can involve changing the storage product itself, which may be expensive or not practical to implement.

It also may be possible to create a new volume from a snapshot through a backup product. The backup product can be installed as part of a backup storage system. Such an approach may involve providing the virtual machine read and write access to a temporary volume in faster storage that is restored and hydrated lazily from backup. The temporary volume may be migrated live to a new permanent volume. However, such an approach can be inefficient due to the resource consumption of live migration.

Accordingly, embodiments of the present disclosure can clone storage volume snapshots from backup for ready access to a virtual machine. Cloning refers to making a copy, in this instance, a copy of a storage volume snapshot for a virtual machine. When initiating a virtual machine or attaching a storage volume clone, embodiments of the present disclosure can clone the associated storage volumes from backup into a relatively faster storage medium to enable operation of the virtual machine in a relatively short time.

Figure 1:
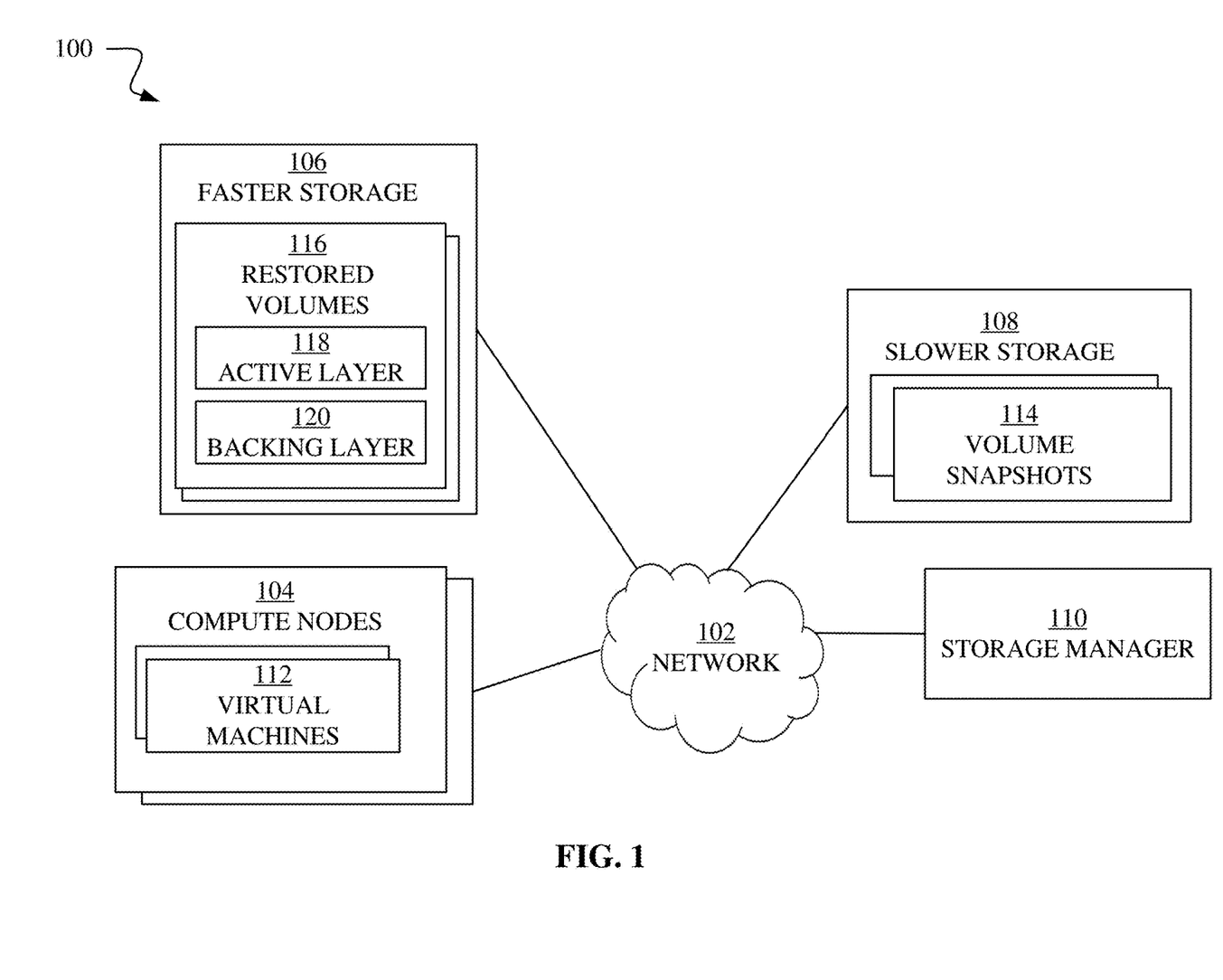
FIG. 1 is a block diagram of an example system for cloning storage volumes from backup, in accordance with some embodiments of the present disclosure.

FIG. 1 is a block diagram of an example system 100, in accordance with some embodiments of the present disclosure. The system 100 includes a network 102, compute nodes 104, faster storage 106, slower storage 108, and storage manager 110. The network 102 may be a local area network, wide area network, or collection of computer communication networks that facilitates communication between components of the system 100, specifically, between the compute nodes 104, faster storage 106, slower storage 108, and storage manager 110. In some embodiments, the network 102 can be the Internet.

The compute nodes 104 can be computer processing devices comprising a memory and one or more processors. In embodiments of the present disclosure, the compute nodes 104 can host virtual machines 112. As stated previously, the virtual machines 112 can be computer applications that behave like a computing device.

The faster storage 106 and slower storage 108 can be computer memory devices with different operational speeds. The faster storage 106 can include flash memory, for example, while the slower storage 108 can be disk or tape storage. The slower storage 108 can host backup storage for the virtual machines 112. More specifically, the slower storage 108 can include volume snapshots 114, which can include disk images of the virtual machines 112.

The storage manager 110 can restore the volume snapshots 114 for use by the virtual machines 112. More specifically, the storage manager 110 can copy the volume snapshots 114 of the slower storage 108 to the restored volumes 116 of the faster storage 106. The restored volumes 116 can include an active layer 118 and a backing layer 120. Each of the virtual machines 112 can be attached to an active layer 118 and a backing layer 120. The active layer 118 can provide read-write access to the virtual machine. The backing layer 120 can include snapshot volumes of the volume snapshots 114 that are hydrated lazily. In some embodiments of the present disclosure, the backing layer 120 can include cache memory or cache disk storage.

According to some embodiments of the present disclosure, the storage manager 110 can create the active layer 118 and the backing layer 120 for each of the restored volumes 116 using a volume file format, such as quick copy on write (QCOW2) and virtual hard disk (VHD), which support copy on write (COW) snapshots. Additionally, the storage manager 110 can attach the active layer 118 to a user VM and start the user VM. Additionally, the storage manager 110 can pull blocks from the backing layer 120 to the active layer 118 in the background to hydrate the restored volume 116 fully. Additionally, the storage manager 110 can detach the backing layer 120 after all blocks are pulled into the active layer 118.

In some embodiments of the present disclosure, the storage manager 110 can attach the active layer 118 to a service VM if the user is not starting the VM right away. In such embodiments, the storage manager 110 can start pulling the blocks from the backing layer 120 to the active layer 118. Additionally, the storage manager 110 can switch the volume attachment from the service VM when the user wants to attach the restored volume 116 to a user VM. Further, the user VM can save blocks that are read by the running VM before the block-pull process reaches them in the active layer 118.

Figure 2A:
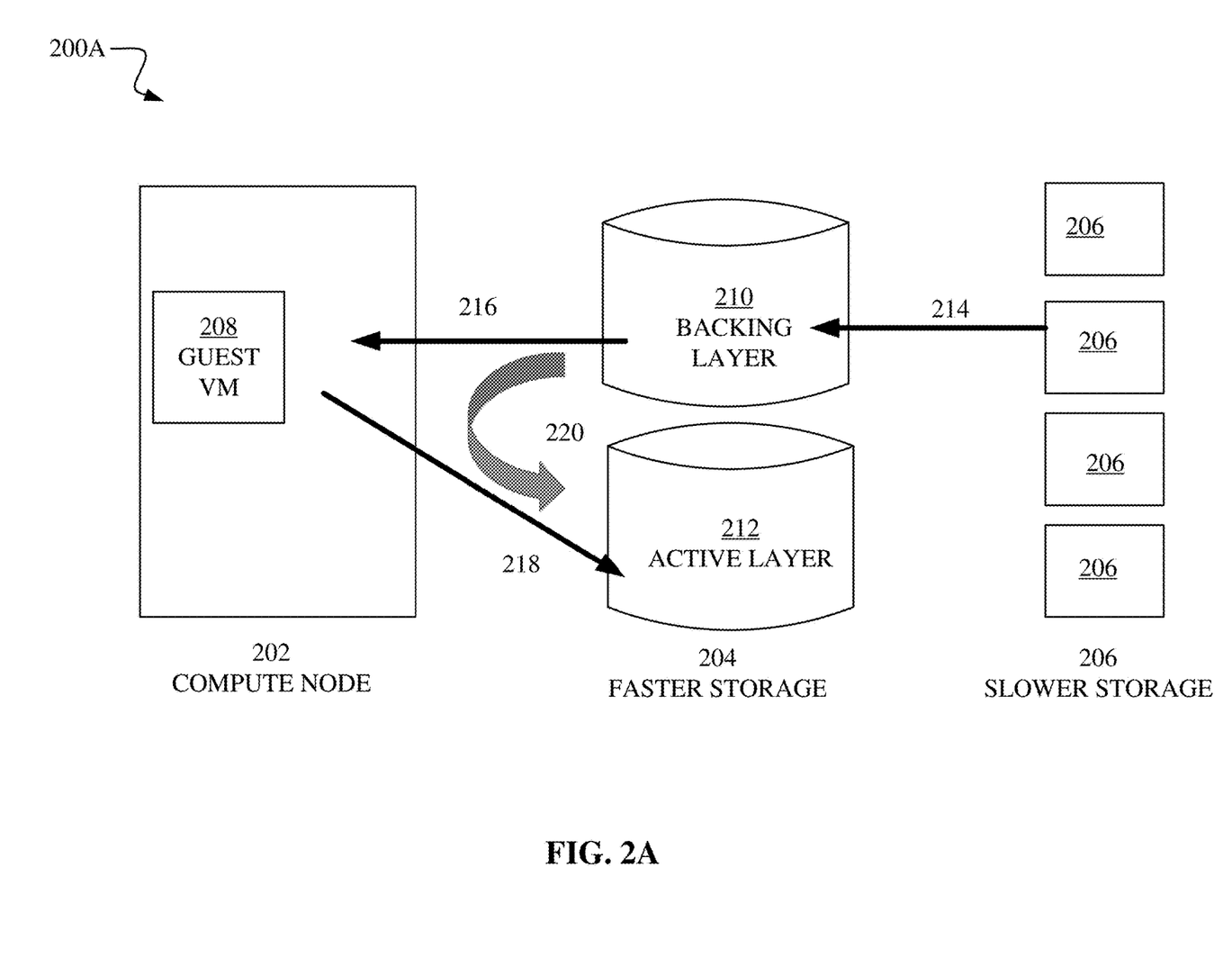
FIG. 2A is a data flow diagram of an example method for cloning storage volumes from backup, in accordance with some embodiments of the present disclosure.

FIG. 2A is a block diagram of an example method 200A for creating a new volume from a snapshot using layered volume files, in accordance with some embodiments of the present disclosure. A storage manager, such as the storage manager 110 described with respect to FIG. 1, can perform the method 200A. Referring back to FIG. 2A, the method 200A incorporates compute node 202, faster storage 204, and slower storage 206. The compute node 202 can be similar to the compute nodes 104. The faster storage 204 can be similar to the faster storage 106. The slower storage 206 can be similar to the slower storage 108. The backing layer 210 and active layer 212 are similar to the backing layer 120 and active layer 118, respectively. Additionally, the faster storage 204 includes a backing layer 210 and an active layer 212.

The compute node 202 can include a guest VM 210. The guest VM 210 can represent an executing instance of the virtual machine, such as the VM 112. The compute node 202 is a host and thus, the VM is a guest, i.e., guest VM 210.

The arrows in FIG. 2A represent operations of the method 200A. More specifically, at operation 214, the storage manager 110 can restore a volume snapshot from the slower storage 206 to the backing layer 210. Additionally, the storage manager 110 can hydrate the backing layer 210 lazily.

According to some embodiments of the present disclosure, the guest VM 210 reads from the backing layer 210 and writes to the active layer 212. Accordingly, at operation 216, the guest VM 210 can read from the backing layer 210. Further, at operation 218, the guest VM 210 can write to the active layer 212. At operation 220, the storage manager 110 can block pull from the backing layer 210 to the active layer 212. The block pull involves copying the entire volume snapshot from the slower storage 206 through the backing layer 210 to the active layer 212.

Figure 2B:
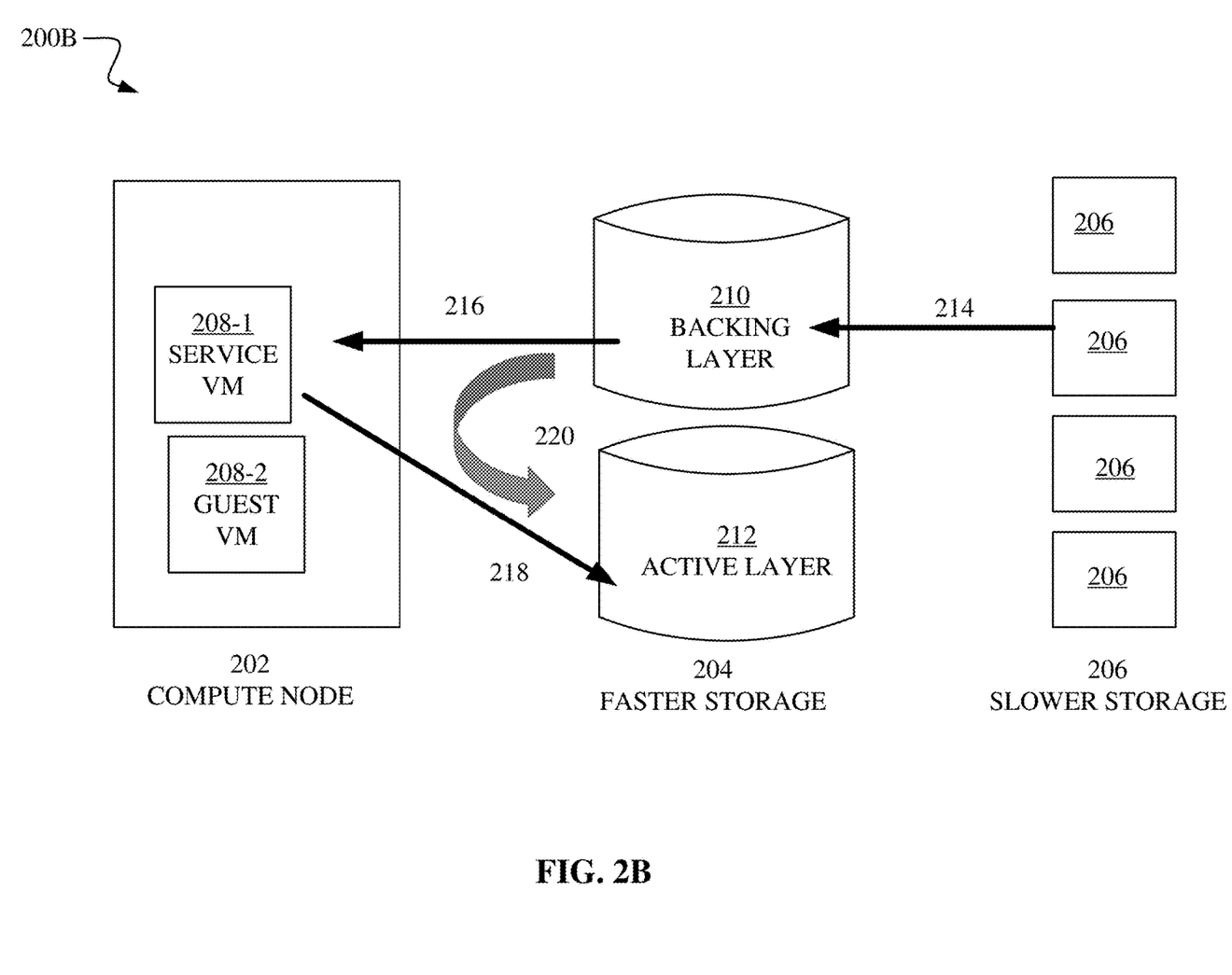
FIG. 2B is a data flow diagram of an example method for cloning storage volumes from backup, in accordance with some embodiments of the present disclosure.

FIG. 2B is a block diagram of an example method 200B for creating a new volume from a snapshot using layered volume files and a service virtual machine, in accordance with some embodiments of the present disclosure. The storage manager 110 and service VM 210-1 can perform the method 200B. The method 200B incorporates compute node 202, faster storage 204, and slower storage 206.

According to some embodiments of the present disclosure, the compute node 202 can include a service VM 208-1 and guest VM 208-2. The service VM 208-1 can be a service instance of a virtual machine that can hydrate the active layer 212 before the guest VM attaches the active layer 212. The hydration operation is suspended when the guest VM 208-2 needs to attach the volume.

The arrows in FIG. 2B represent operations of the method 200B. More specifically, at operation 220, the storage manager 110 initiates data hydration of the active layer 212 from a volume snapshot from the slower storage 206 through the backing layer 210. Additionally, the storage manager 110 can hydrate the backing layer 210 and the active layer 212 lazily.

According to some embodiments of the present disclosure, the service VM 208-1 reads from the backing layer 210 and writes to the active layer 212. Accordingly, at operation 216, the service VM 208-1 can read from the backing layer 210. Further, at operation 218, the service VM 208-1 can write to the active layer 212. At operation 220, the storage manager 110 can initiate a block pull from the backing layer 210 to the active layer 212. The block pull involves copying the entire volume snapshot to the active layer 212 through the backing layer 210.

Figure 3A:
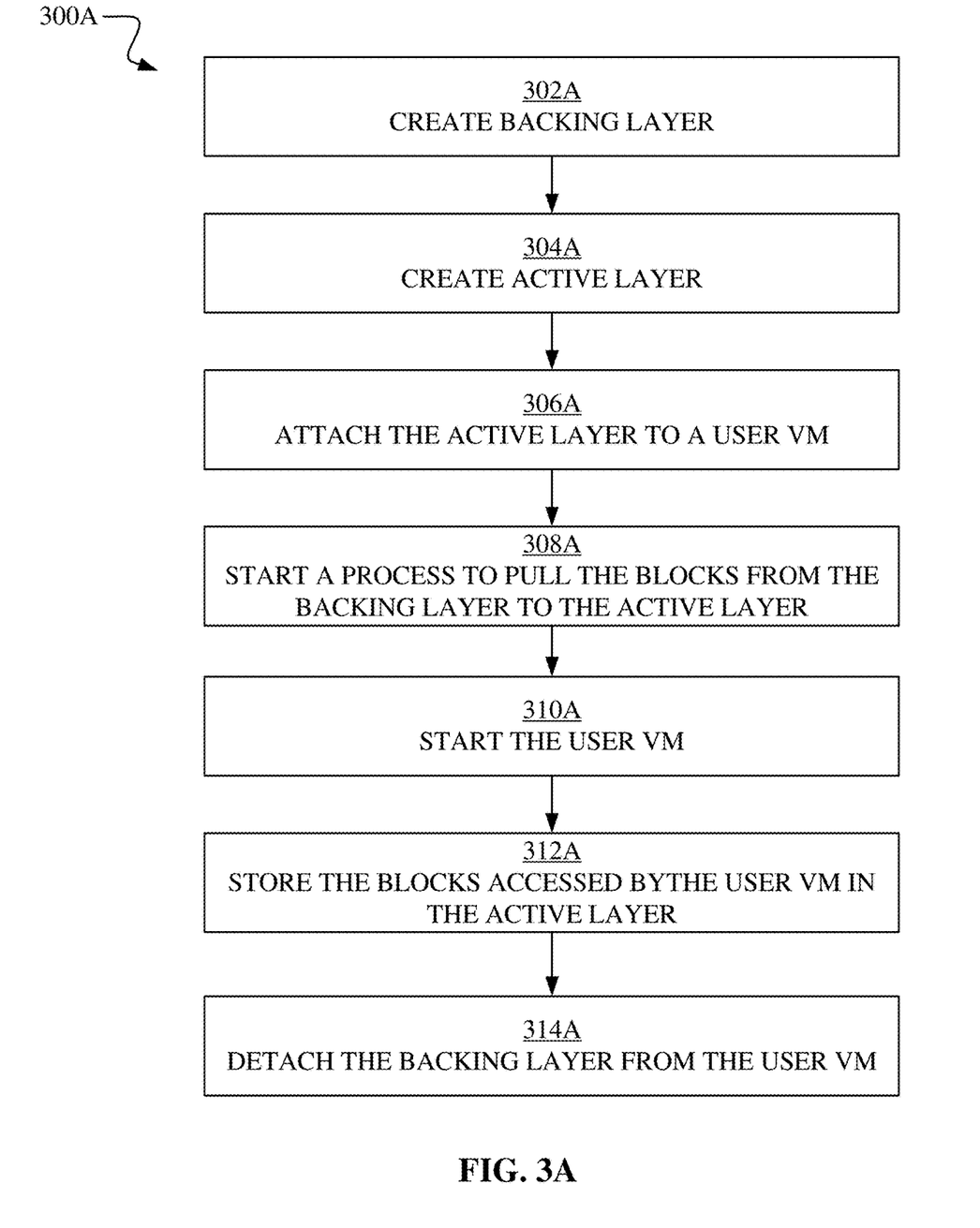
FIG. 3A is a process flow diagram of an example method for cloning storage volumes from backup, in accordance with some embodiments of the present disclosure.

FIG. 3A is a process flow diagram of an example method 300A for cloning storage volumes from backup, in accordance with some embodiments of the present disclosure. The storage manager 110 and a user VM, such as the VM 112, can perform the method 300A.

At operation 302A, the storage manager 110 can create a backing layer, such as the backing layer 120. Creating the backing layer 120 can involve creating a virtual volume file representing the snapshot of the volume snapshot 114 using a format that supports layering.

At operation 304A, the storage manager 110 can create an active layer, such as the active layer 116. Creating the active layer 118 can involve creating another virtual volume file representing a copy (the clone) of the snapshot using the same format backed by the volume file created in operation 302A.

At operation 306A, the storage manager 110 can attach the active layer 118 to a user VM. Attaching the active layer 118 can involve assigning the restored volume 116 to the user VM.

At operation 308A, the storage manager 110 can start a process to pull the blocks from the backing layer 120 to the active layer 118. The process can be a background or batch process and involves copying hydrated portions of the restored volume 116 to the active layer 118.

At operation 310A, the user VM can start. Starting the user VM can involve initiating a booting process using files from the active layer 118 and/or backing layer 120.

At operation 312A, the storage manager 110 can store the blocks accessed by the user VM in the active layer 118. In other words, as the user VM reads from the backing layer 120, the storage manager 110 can copy the read blocks to the active layer 118.

At operation 314A, the storage manager 110 can detach the backing layer 120 from the user VM. After the block pull process completes, the storage manager 110 can free the backing layer 120.

Figure 3B:
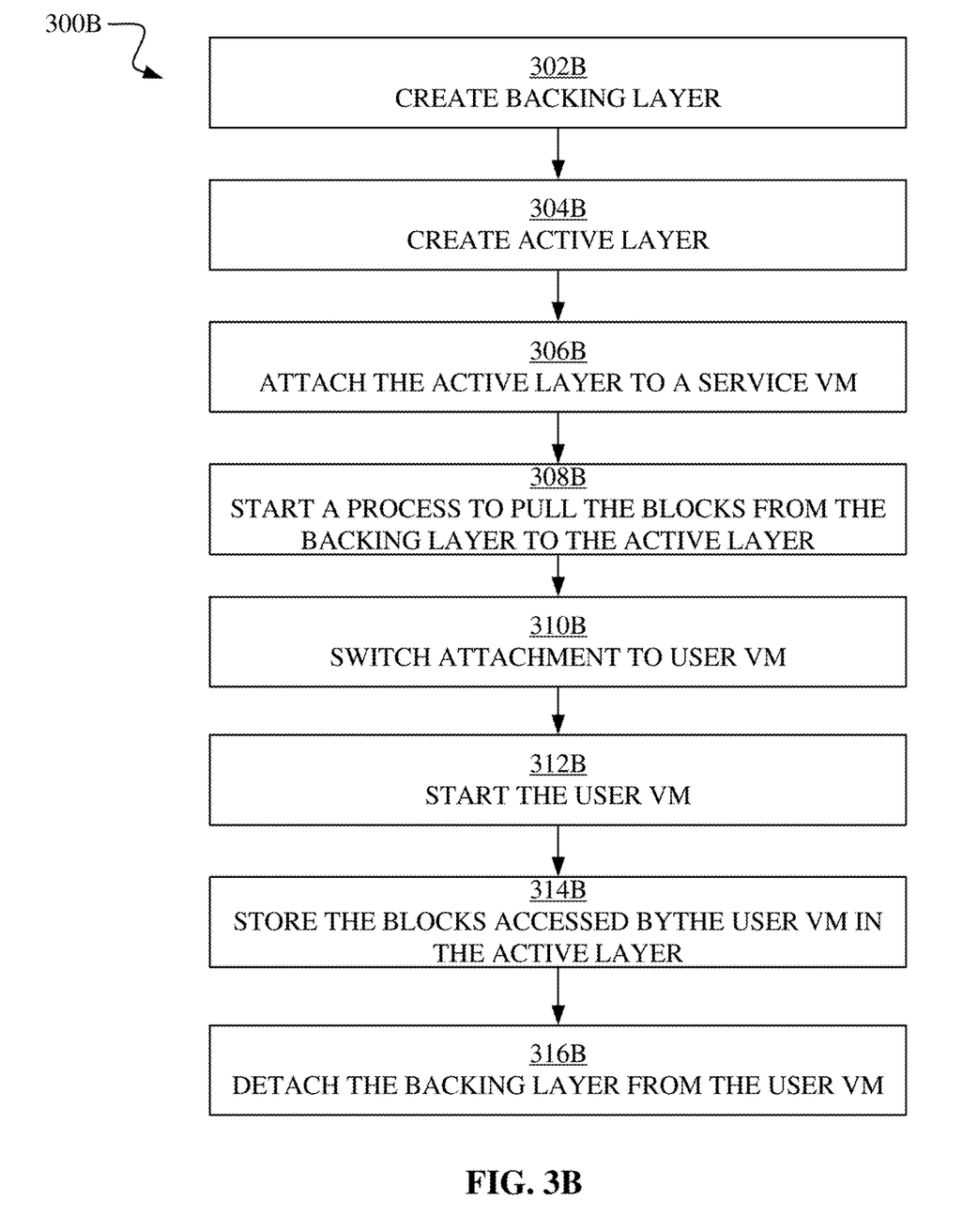
FIG. 3B is a process flow diagram of an example method for cloning storage volumes from backup using a service VM, in accordance with some embodiments of the present disclosure.

FIG. 3B is a process flow diagram of an example method 300B for cloning storage volumes from backup using a service VM, in accordance with some embodiments of the present disclosure. The storage manager 110. Additionally, a service VM and a user VM, e.g., respectively, guest VMS 210-1, 210-2, can perform the method 300B. Within, operations 302B through 304B, are similar to operations 302A through 304A, and not further described.

At operation 306B, the storage manager 110 can attach the active layer 118 to a service VM. In some embodiments of the present disclosure, the storage manager 110 can attach the active layer 118 to a service VM until the user attaches the active layer 118 to the user's own VM.

At operation 308B, the storage manager 110 can start a process to pull the blocks from the backing layer 120 to the active layer 118. The process can be a background or batch process and involves copying hydrated portions of the restored volume 116 to the active layer 118.

At operation 310B, the storage manager 110 can switch the attachment of the active layer 118 to a user VM. In some cases, the storage manager 110 can complete the block pull process before switching attachment to the user VM. In other cases, the storage manager 110 can switch attachment to the user VM upon request and continue the block pull process.

At operation 312B, the storage manager 110 can start the user VM. Starting the user VM can involve initiating a booting process.

At operation 314B, the storage manager 110 can store the blocks accessed by the user VM in the active layer 118. In other words, as the user VM reads from the backing layer 120, the storage manager 110 can copy the read blocks to the active layer 118.

At operation 316B, the storage manager 110 can detach the backing layer 120 from the user VM. After the block pull process completes, the storage manager 110 can free the backing layer 120.

In some embodiments of the present disclosure, the VM and storage manager described in the methods 300A, 300B can be used as a storage agent running on a bare metal machine and/or a storage/network adapter. Such storage agents on bare metal machine can perform operations of the methods 300A and 300B and serve the clone as a new storage volume to the applications running on the bare metal machine or the machine where the storage/network adapter is included. Additionally, such storage agents can serve the clone of the volume snapshot to applications running on other bare metal machines and/or virtual machines that are in communication with the bare metal machine over the network 102.

Figure 4:
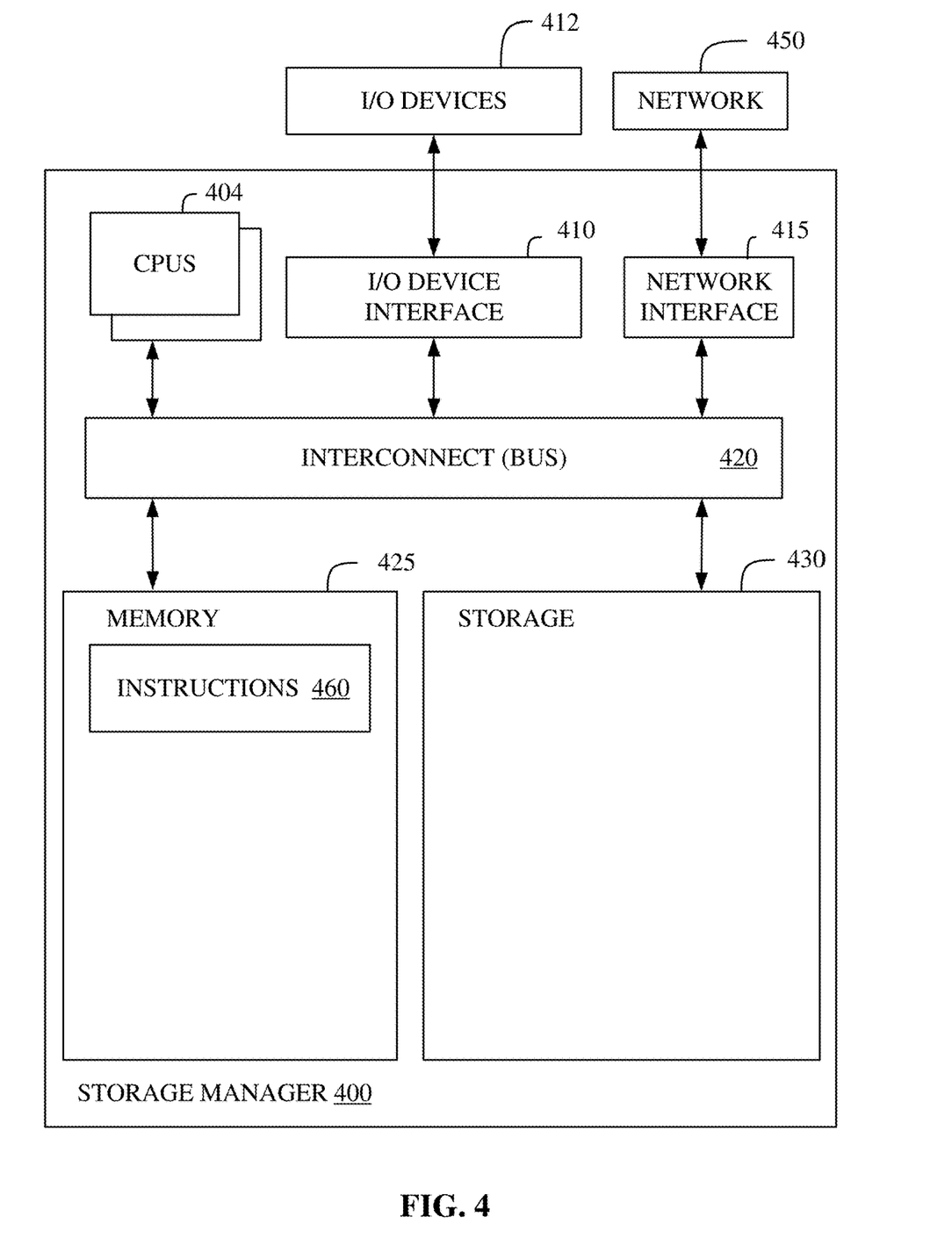
FIG. 4 is a block diagram of an example storage manager, in accordance with some embodiments of the present disclosure.

FIG. 4 is a block diagram of an example storage manager 400, in accordance with some embodiments of the present disclosure. In various embodiments, the storage manager 400 is similar to the storage manager 110 and can perform the methods described in FIGS. 3A and 3B, and/or the functionality discussed in FIGS. 1, 2A, and 2B. In some embodiments, the storage manager 400 provides instructions for the aforementioned methods and/or functionalities to a client machine such that the client machine executes the method, or a portion of the method, based on the instructions provided by the storage manager 400. In some embodiments, the storage manager 400 comprises software executing on hardware incorporated into a plurality of devices.

The storage manager 400 includes a memory 425, storage 430, an interconnect (e.g., BUS) 420, one or more CPUs 405 (also referred to as processors 405 herein), an I/O device interface 410, I/O devices 412, and a network interface 415.

Each CPU 405 retrieves and executes programming instructions stored in the memory 425 or the storage 430. The interconnect 420 is used to move data, such as programming instructions, between the CPUs 405, I/O device interface 410, storage 430, network interface 415, and memory 425. The interconnect 420 can be implemented using one or more busses. The CPUs 405 can be a single CPU, multiple CPUs, or a single CPU having multiple processing cores in various embodiments. In some embodiments, a CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random access memory (e.g., static random access memory (SRAM), dynamic random access memory (DRAM), or Flash). The storage 430 is generally included to be representative of a non-volatile memory, such as a hard disk drive, solid state device (SSD), removable memory cards, optical storage, and/or flash memory devices. Additionally, the storage 430 can include storage area-network (SAN) devices, the cloud, or other devices connected to the storage manager 400 via the I/O device interface 410 or to a network 450 via the network interface 415.

In some embodiments, the memory 425 stores instructions 460. However, in various embodiments, the instructions 460 are stored partially in memory 425 and partially in storage 430, or they are stored entirely in memory 425 or entirely in storage 430, or they are accessed over a network 450 via the network interface 415.

Instructions 460 can be processor-executable instructions for performing any portion of, or all, any of the method described in FIGS. 3A and 3B, and/or the functionality discussed in FIGS. 1, 2A, and 2B.

In various embodiments, the I/O devices 412 include an interface capable of presenting information and receiving input. For example, I/O devices 412 can present information to a listener interacting with storage manager 400 and receive input from the listener.

The storage manager 400 is connected to the network 450 via the network interface 415. Network 450 can comprise a physical, wireless, cellular, or different network.

In some embodiments, the storage manager 400 can be a multi-user mainframe computer system, a single-user system, or a server computer or similar device that has little or no direct user interface but receives requests from other computer systems (clients). Further, in some embodiments, the storage manager 400 can be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary storage manager 400. In some embodiments, however, individual components can have greater or lesser complexity than as represented in FIG. 4, components other than or in addition to those shown in FIG. 4 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
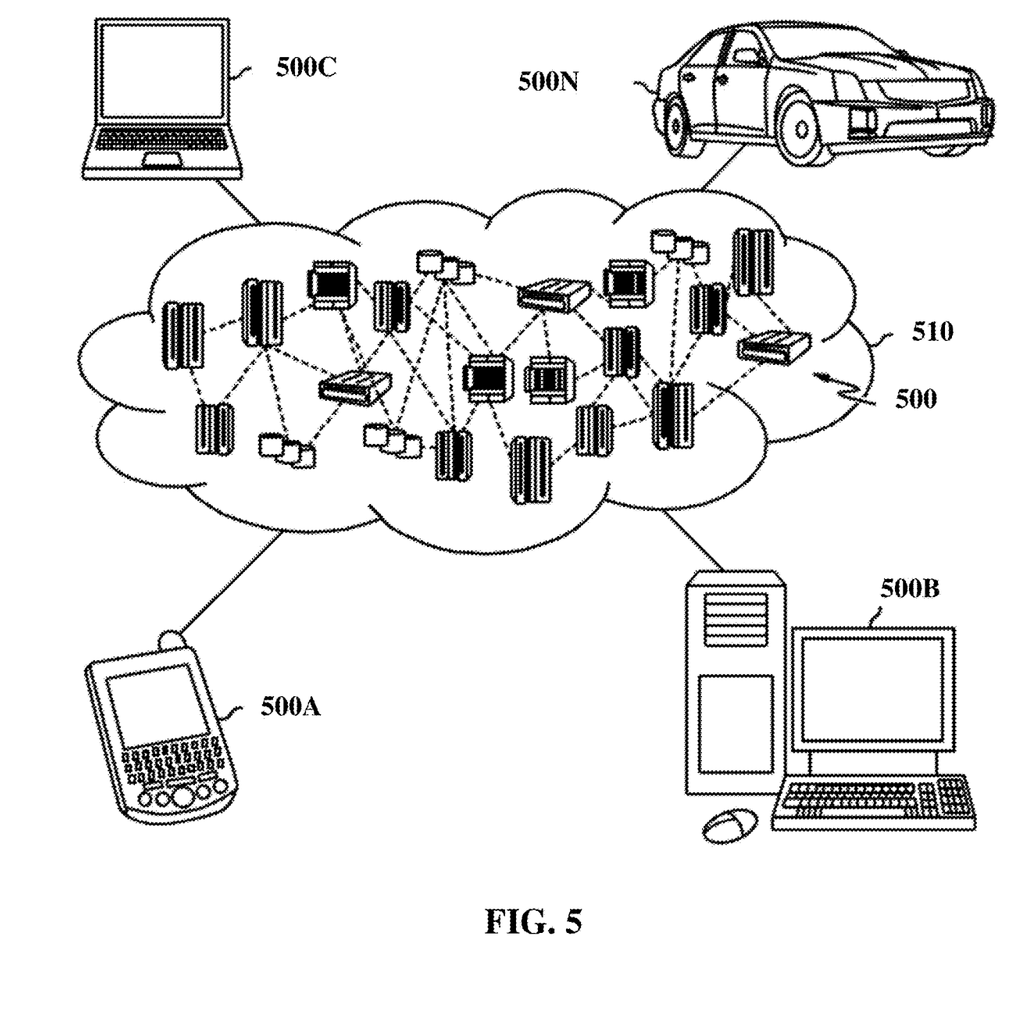
FIG. 5 is a cloud computing environment, in accordance with some embodiments of the present disclosure.

FIG. 5 is a cloud computing environment 510, according to some embodiments of the present disclosure. As shown, cloud computing environment 510 includes one or more cloud computing nodes 500. The cloud computing nodes 500 can perform the method described in FIGS. 3A and 3B, and/or the functionality discussed in FIGS. 1, 2A, and 2B. Additionally, cloud computing nodes 500 can communicate with local computing devices used by cloud consumers, such as, for example, personal digital assistant (PDA) or cellular telephone 500A, desktop computer 500B, laptop computer 500C, and/or automobile computer system 500N. Further, the cloud computing nodes 500 can communicate with one another. The cloud computing nodes 500 can also be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
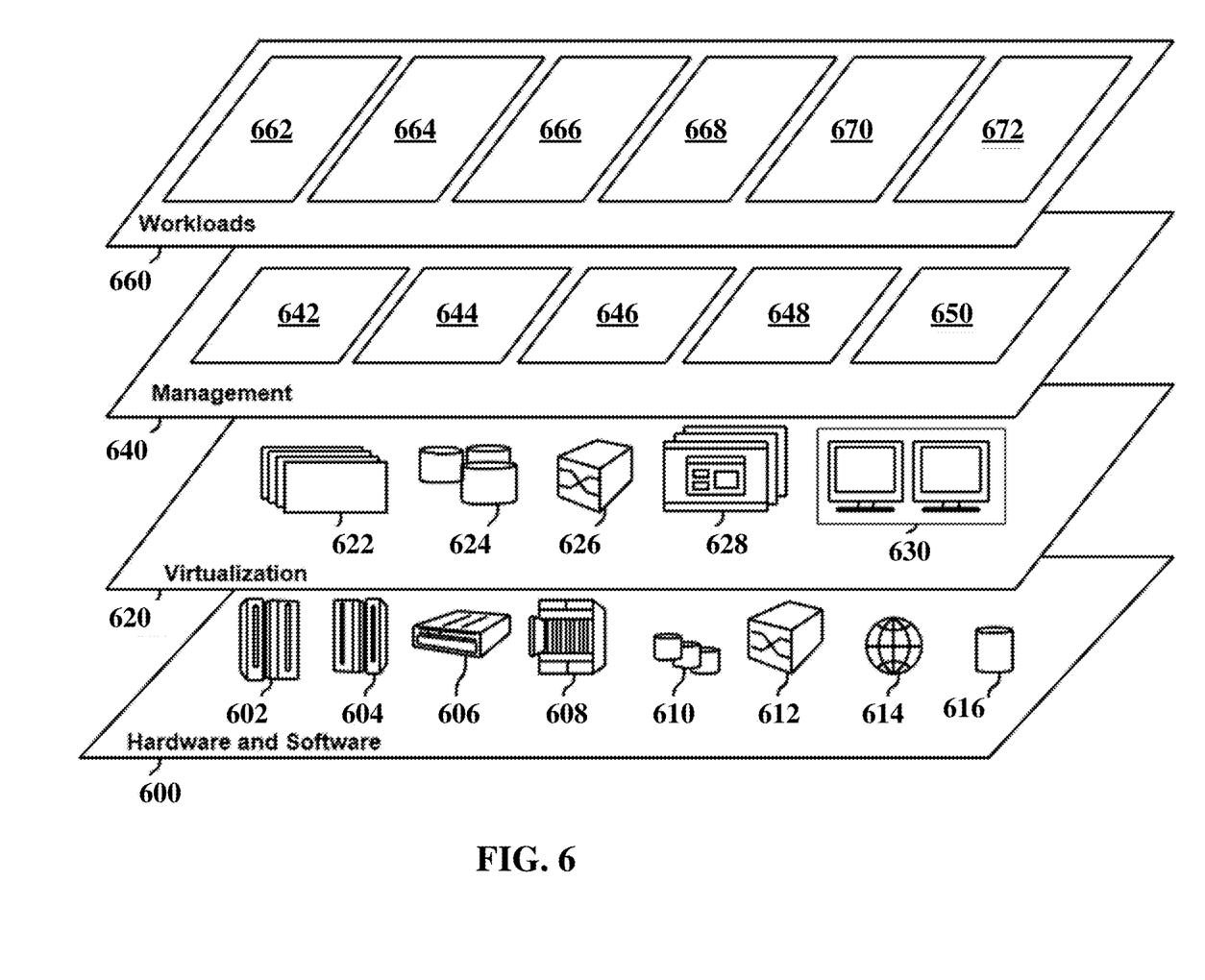
FIG. 6 is a set of functional abstraction model layers provided by the cloud computing environment, in accordance with some embodiments of the present disclosure.

FIG. 6 is a set of functional abstraction model layers provided by cloud computing environment 510 (FIG. 5), according to some embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities can be provided: virtual servers 622; virtual storage 624; virtual networks 626, including virtual private networks; virtual applications and operating systems 628; and virtual clients 630.

In one example, management layer 640 can provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service level management 648 can allocate suitable processing power and memory to process static sensor data. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment can be utilized. Examples of workloads and functions which can be provided from this layer include: mapping and navigation 662; software development and lifecycle management 664; virtual classroom education delivery 666; data analytics processing 668; transaction processing 670; and storage manager 672.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Python or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
generating a backing layer comprising a first file volume, in a layering file format and representing a first portion of a clone of a volume snapshot that is backed up on a slower storage, and enabling an associated virtual machine;
generating an active layer comprising a second file volume, in the layering file format, representing a second portion of the clone of the volume snapshot, and enabling the associated virtual machine;
starting a process to pull a plurality of blocks from the backing layer to the active layer; and
performing lazy hydration of the backing layer using a backup application, wherein performing the lazy hydration comprises copying specific parts of the first file volume on-demand in response to a request from the associated virtual machine to read the specific parts.

2. The method of claim 1, further comprising attaching the backing layer to the associated virtual machine.

3. The method of claim 1, further comprising attaching the active layer to the associated virtual machine.

4. The method of claim 1, further comprising starting the associated virtual machine, wherein the associated virtual machine reads from the backing layer, and wherein the associated virtual machine reads and writes to the active layer.

5. The method of claim 1, wherein a bare metal machine comprises a storage agent comprising a storage manager and the associated virtual machine, wherein the storage agent:
generates the backing layer;
generates the active layer;
starts the process to pull the plurality of blocks from the backing layer to the active layer; and
serves the clone of the volume snapshot to one or more applications running on: 1) the bare metal machine, 2) one or more other bare metal machines that are in communication with the bare metal machine over a network, and 3) one or more other virtual machines that are in communication with the bare metal machine over the network.

6. The method of claim 1, wherein a network adapter comprises a storage agent comprising a storage manager and the associated virtual machine, wherein the storage agent:
generates the backing layer;
generates the active layer;
starts the process to pull the plurality of blocks from the backing layer to the active layer; and
serves the clone of the volume snapshot to one or more applications running on: 1) a bare metal machine to which the network adapter is attached, 2) one or more other bare metal machines that are in communication with the bare metal machine over a network, and 3) one or more other virtual machines that are in communication with the bare metal machine over the network.

7. The method of claim 1, further comprising:
attaching the active layer to a service virtual machine for the associated virtual machine;
switching an attachment of the active layer from the service virtual machine to the associated virtual machine; and
starting the associated virtual machine, wherein the associated virtual machine reads from the backing layer, and wherein the associated virtual machine reads and writes to the active layer.

8. The method of claim 7, further comprising:
completing the process to pull the plurality of blocks; and
detaching the backing layer from the service virtual machine.

9. The method of claim 1, further comprising the associated virtual machine reading a block of the backing layer and writing the block of the backing layer to the active layer.

10. The method of claim 1, further comprising storing the backing layer and the active layer into a faster storage type than the slower storage.

11. The method of claim 1, further comprising:
determining that the active layer comprises the volume snapshot; and
detaching the volume snapshot from the associated virtual machine.

12. A computer program product comprising program instructions stored on one or more computer readable storage media, the program instructions executable by one or more processors to cause the processors to perform a method comprising:
generating a backing layer comprising a first file volume, in a layering file format and representing a first portion of a volume snapshot that is backed up on a slower storage, and enabling an associated virtual machine;
generating an active layer comprising a second file volume, in the layering file format, representing a second portion of the volume snapshot, and enabling the associated virtual machine;
starting a process to pull a plurality of blocks from the backing layer to the active layer;
attaching the active layer to the associated virtual machine;
starting the associated virtual machine, wherein the associated virtual machine reads from the backing layer, and wherein the associated virtual machine reads and writes to the active layer; and
performing lazy hydration of the backing layer using a backup application, wherein performing the lazy hydration comprises copying specific parts of the first file volume on-demand in response to a request from the associated virtual machine to read the specific parts.

13. The computer program product of claim 12, wherein a bare metal machine comprises a storage agent comprising a storage manager and the associated virtual machine, wherein the storage agent:
generates the backing layer;
generates the active layer;
starts the process to pull the plurality of blocks from the backing layer to the active layer; and
serves the clone of the volume snapshot to one or more applications running on: 1) the bare metal machine, 2) one or more other bare metal machines that are in communication with the bare metal machine over a network, and 3) one or more other virtual machines that are in communication with the bare metal machine over the network.

14. The computer program product of claim 12, wherein a network adapter comprises a storage agent comprising a storage manager and the associated virtual machine, wherein the storage agent:
generates the backing layer;
generates the active layer;
starts the process to pull the plurality of blocks from the backing layer to the active layer; and
serves the clone of the volume snapshot to one or more applications running on: 1) a bare metal machine to which the network adapter is attached, 2) one or more other bare metal machines that are in communication with the bare metal machine over a network, and 3) one or more other virtual machines that are in communication with the bare metal machine over the network.

15. The computer program product of claim 12, the method further comprising the associated virtual machine reading a block of the backing layer and writing the block of the backing layer to the active layer.

16. The computer program product of claim 12, the method further comprising:
storing the backing layer and the active layer into a faster storage type than the slower storage;
attaching the backing layer to the associated virtual machine;
determining that the active layer comprises the volume snapshot; and
detaching the volume snapshot from the associated virtual machine.

17. A system comprising:
one or more computer processing circuits; and
one or more computer-readable storage media storing instructions, which, when executed by the computer processing circuits, are configured to cause the computer processing circuits to perform a method comprising:
generating a backing layer comprising a first file volume, in a layering file format and representing a first portion of a volume snapshot that is backed up on a slower storage, and enabling an associated virtual machine;
generating an active layer comprising a second file volume, in the layering file format, representing a second portion of the volume snapshot, and enabling the associated virtual machine;
starting a process to pull a plurality of blocks from the backing layer to the active layer;
attaching the active layer to a service virtual machine for the associated virtual machine;
switching an attachment of the active layer from the service virtual machine to the associated virtual machine;
starting the associated virtual machine, wherein the associated virtual machine reads from the backing layer, and wherein the associated virtual machine reads and writes to the active layer; and
performing lazy hydration of the backing layer using a backup application, wherein performing the lazy hydration comprises copying specific parts of the first file volume on-demand in response to a request from the associated virtual machine to read the specific parts.

18. The system of claim 17, wherein a bare metal machine comprises a storage agent comprising a storage manager and the associated virtual machine, wherein the storage agent:
generates the backing layer;
generates the active layer;
starts the process to pull the plurality of blocks from the backing layer to the active layer; and
serves the clone of the volume snapshot to one or more applications running on: 1) the bare metal machine, 2) one or more other bare metal machines that are in communication with the bare metal machine over a network, and 3) one or more other virtual machines that are in communication with the bare metal machine over the network.

19. The system of claim 17, wherein a network adapter comprises a storage agent comprising a storage manager and the associated virtual machine, wherein the storage agent:

generates the backing layer;
generates the active layer;
starts the process to pull the plurality of blocks from the backing layer to the active layer; and
serves the clone of the volume snapshot to one or more applications running on: 1) a bare metal machine to which the network adapter is attached, 2) one or more other bare metal machines that are in communication with the bare metal machine over a network, and 3) one or more other virtual machines that are in communication with the bare metal machine over the network.

\* \* \* \* \*